United States Patent [19]

Sloot

[11] 3,883,668

[45] May 13, 1975

[54] IMPROVING GOUDA CHEESE FLAVOR

[75] Inventor: Dirk Sloot, Vlaardingen, Netherlands

[73] Assignee: Lever Brothers Company, New York, N.Y.

[22] Filed: June 21, 1973

[21] Appl. No.: 372,113

[30] Foreign Application Priority Data

June 21, 1972 United Kingdom.............. 29053/72
June 21, 1972 United Kingdom.............. 29054/72

[52] U.S. Cl. ................................................ 426/535
[51] Int. Cl................................................ A23l 1/26
[58] Field of Search ............. 426/65, 175, 188, 361

[56] References Cited

UNITED STATES PATENTS 3,034,902  5/1962  Bavisotto ........................ 426/188 X

*Primary Examiner*—Joseph M. Golian
*Attorney, Agent, or Firm*—James J. Farrell, Esq.; Melvin H. Kurtz, Esq.; Arnold Grant, Esq.

[57] ABSTRACT

A cheese flavour is given to a food product by the addition of 2,4-dithiapentane and/or trans-anethole. Addition of the compound or compounds is particularly useful to impart or enhance a Gouda cheese flavour.

7 Claims, No Drawings

IMPROVING GOUDA CHEESE FLAVOR

The invention relates to a process for flavouring food products with the flavour of cheese.

BACKGROUND OF THE INVENTION

The production of products in which a good cheese flavour is desired is of considerable importance. Examples of such products include processed cheese, cheese snacks and cheese sauces. In the traditional method of preparing e.g. processed cheese, old cheese is added to give the product the required flavour but the use of flavouring compositions in place of at least part of the old cheese has also been disclosed. It has now been found that the addition of 2,4-dithiapentane $CH_3.S.CH_2.S.CH_3$ and/or trans-anethole 1-(p-methoxyphenyl)prop-1-ene gives a cheese flavour, particularly a Gouda cheese flavour to the products.

THE INVENTION

The invention therefore provides a process for enhancing or imparting a cheese flavour to a food in which 2,4-dithiapentane and/or trans-anethole is added to the food.

Of course the amount of the compound or compounds added to the food product must be such as to give the required flavour to the product. The amount will vary depending on the type of food and indeed on the taste of the consumers for which the product is intended. But as a guide the amount should be such that when 2,4-dithiapentane is used, the total amount of 2,4-dithiapentane in the food is between 0.005 and 0.05 ppm, and when trans-anethole is used, the total amount of trans-anethole in the food is between 0.05 and 5 ppm, preferably between 0.05 and 2 ppm. The compound or compounds can be added at any suitable stage.

Advantageously when 2,4-dithiapentane is used, it is used in combination with a pyrazine. Although pyrazines do not have any special effect in cheese flavouring compositions, it has been found that use of a pyrazine in combination with 2,4-dithiapentane leads to a surprisingly improved effect, particularly a Gouda cheese flavour effect. Preferred pyrazines are alkyl-substituted pyrazines, particularly 2,5-diethyl-3-methyl pyrazine.

The amount of 2,4-dithiapentane should preferably be such that the end product that has been flavoured contains more than 0.005 ppm 2,4-dithiapentane and less than 0.05 ppm. The amount of pyrazine should preferably be such that the product contains more than 0.01 ppm and less than 0.5 ppm, particularly preferably less than 0,25 ppm. The weight ratio of dithiapentane to pyrazine should preferably be between 1:4 and 1:6.

Known ingredients of Gouda-cheese flavoring compositions (s) can also be added.

The invention will now be illustrated by the following Examples.

The following Gouda-cheese flavoring compositions (s) were used in the Examples as illustrations of Gouda cheese flavouring compositions, which can be improved by incorporation of trans-anethole and/or 2,4-dithiapentane.

| Gouda-cheese flavoring compositions(s) | ppm* | ppm* | ppm* |
| --- | --- | --- | --- |
| butanoic acid | 400 | 40 | 100 |
| hexanoic acid | 80 | 40 | 20 |
| octanoic acid | 80 | 20 | 20 |
| decanoic acid | 60 | 10 | 15 |
| dodecanoic acid | 60 | 10 | 15 |
| tetradecanoic acid | 60 | — | 15 |
| methyl propyl ketone | 3 | 1.5 | 1 |
| methyl pentyl ketone | 3 | 1.5 | 1 |
| ethyl hexanoate | 1.5 | 0.75 | 0.4 |
| delta-dodeca-lactone | 20 | 10 | 5 |
| dimethylsulphide | 0.3 | 0.15 | 0.1 |
| diacetyl | 1.5 | 0.75 | 0.4 |
| methional | 0.3 | 0.15 | 0.1 |
| 4-cis heptenal | 0.003 | 0.001 | 0.001 |
| monosodium glutamate | 3000 | 3000 | 1000 |
| methionine | 1000 | 1000 | 250 |
| L-lysine HCl | 2000 | 2000 | 500 |
| calcium butanoate | — | — | 80 |
| calcium 3 methyl butanoate | — | — | 40 |
| calcium succinate | — | — | 125 |

*in the edible product

Comp. A

A processed cheese was prepared from young Gouda cheese and Gouda-cheese flavoring compositions (s).

EXAMPLE I

A processed cheese was prepared as Comp. A. During its preparation, however, an amount of trans-anethole was added to give 0.75 ppm trans-anethole in the processed cheese. The flavour of the resulting product obtained a higher rating than Comp. A by 6 out of 7 experienced members of a taste/flavour panel with regard to its resemblance to old Gouda cheese flavour.

Comp. B

A cheese sauce was prepared from flour, old Gouda cheese, common salt, water and Gouda-cheese flavoring compositions (s).

EXAMPLE II

A cheese sauce was prepared as Comp. B. During its preparation, however, an amount of trans-anethole was added to give 0.5 ppm trans-anethole in the cheese sauce. The flavour of the resulting product more closely resembled the flavour of old Gouda cheese than Comp. B.

Comp. C

A processed cheese was prepared from young Gouda cheese and Gouda-cheese flavoring compositions (s).

EXAMPLE III

A processed cheese was prepared as Comp. C. During its preparation, however, an amount of 2,4-dithiapentane was added to give 0.018 ppm 2,4-dithiapentane in the processed cheese. The flavour of the resulting product more closely resembled the flavour of old Gouda cheese than Comp. C.

EXAMPLE IV

A processed cheese was prepared as in Example III. During its preparation additionally an amount of 2,5-diethyl-3-methyl pyrazine was added, to give 0.085 ppm 2,5-diethyl-3-methyl pyrazine in the processed cheese. In comparison with the product of Example III the cheese flavour was more pronounced.

Comp. D

A cheese sauce was prepared from flour, old Gouda cheese, common salt, water and Gouda-cheese flavoring compositions (s).

EXAMPLE V

A cheese sauce was prepared as Comp. D. During its preparation, however, amounts of 2,4-dithiapentane and 2,5-diethyl-3-methyl pyrazine were added to give 0.018 ppm 2,4-dithiapentane and 0.085 ppm 2,5-diethyl-3-methyl pyrazine in the cheese sauce. The flavour of the resulting product was preferred with regard to "cheese resemblance" by 7 out of 10 experienced members of a taste panel over Comp. D.

What is claimed is:

1. In a process for enhancing or imparting an old Gouda-cheese flavor to a Gouda flavored food product, lacking in said old Gouda cheese flavor, the improvement comprising adding to the food product 2,4-dithiapentane and/or trans-anethole to give between 0.005 and 0.05 ppm of dithiapentane and/or between 0.05 and 5 ppm trans-anethole in the food product.

2. A process as defined in claim 1 further comprising adding said 2,4-dithiapentane and a sufficient amount of alkyl pyrazine to the food product to give between 0.01 and 0.5 ppm of said alkyl pyrazine therein.

3. A process as defined in claim 2, in which a sufficient amount of said alkyl pyrazine is added to the food product to give between 0.01 and 0.25 ppm of said alkyl pyrazine therein.

4. A process as defined in claim 2, in which the weight ratio of said 2,4-dithiapentane to said alkyl pyrazine is between 1:4 and 1:6.

5. A process as defined in claim 2, in which said alkyl pyrazine is 2,5-diethyl-3-methyl pyrazine.

6. A process as defined in claim 1, in which a sufficient amount of said trans-anethole is added to the food product to give between 0.05 and 2 ppm of said trans-anethole therein.

7. A process as defined in claim 1 wherein said food product is selected from the group consisting of processed cheese, cheese snacks and cheese sauces.

* * * * *